United States Patent [19]

Kashiwagi

[11] Patent Number: 4,786,972
[45] Date of Patent: Nov. 22, 1988

[54] CRT PHOTOGRAPHY APPARATUS UTILIZING ROTATABLE LENS

[75] Inventor: Atsumi Kashiwagi, Osaka, Japan

[73] Assignee: Fujimoto Photo Industrial Co., Ltd., Osaka, Japan

[21] Appl. No.: 41,943

[22] Filed: Apr. 24, 1987

[30] Foreign Application Priority Data

Dec. 9, 1986 [JP] Japan .................... 61-293170

[51] Int. Cl.$^4$ ............................. H04N 5/76
[52] U.S. Cl. ................... 358/244; 346/110 R; 354/195.12
[58] Field of Search ........... 358/244, 345, 332; 346/110 R; 354/195.12

[56] References Cited

U.S. PATENT DOCUMENTS 4,573,780  3/1986  Sato .................... 354/195.12

FOREIGN PATENT DOCUMENTS

59-25521  8/1982  Japan .
6177827   9/1984  Japan .
60-252332 5/1985  Japan .

Primary Examiner—Robert L. Richardson
Attorney, Agent, or Firm—Armstrong, Nikaido, Marmelstein & Kubovcik

[57] ABSTRACT

An apparatus for photographing images on a CRT comprises a single lens interposed between the CRT and a film, a lens mount for supporting the lens thereon with its optical axis positioned perpendicular to the film, and a drive mechanism for rotating the lens mount about a support shaft substantially parallel with the optical axis. The lens is moved to and stopped at a plurality of positions by the mechanism for focusing the CRT images on the frames of the film individually. The images formed on the film are identical in quality and free from variations in sharpness or density, whereas the apparatus is simple in construction and compact in its entirety.

8 Claims, 8 Drawing Sheets

CRT PHOTOGRAPHY APPARATUS UTILIZING ROTATABLE LENS

BACKGROUND OF THE INVENTION

The present invention relates to an apparatus for photographing CRT images on a plurality of frames of film.

Apparatus are used for photographing on more than one frame of a sheet of film, for example, sectional images of the human body projected on the screen of a CRT by X-ray diagnosis or ultrasonic diagnosis for therapeutic purposes.

Figure 10:
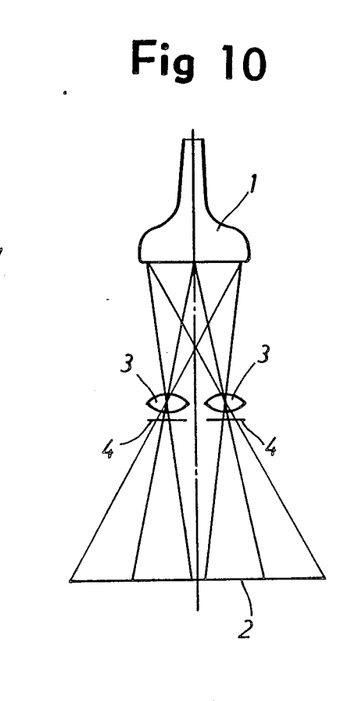
FIGS. 10 and 11 are plan views showing different conventional apparatus.

The conventional photographic apparatus of this type include those having the construction shown in FIG. 10. A film 2 is spaced from the screen of a CRT 1 substantially in parallel therewith, and a plurality of lenses 3 corresponding in number to the number of frames of the film 2 are provided between the film 2 and the CRT 1 for projecting images on the CRT 1 onto the frames of the film 2. Shutters 4 provided in front of the lenses 3 are opened in succession to photograph images on the CRT 1 on the plurality of frames.

Figure 11:
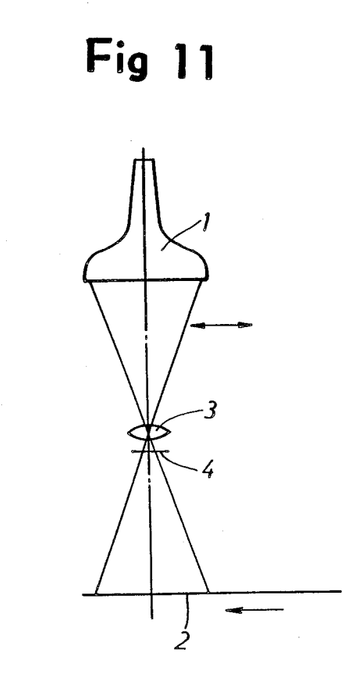

The conventional apparatus further include those having the construction shown in FIG. 11. A film 2 is spaced from the screen of a CRT 1 substantially in parallel therewith, and a single lens 3 is interposed between the film 2 and the CRT 1 with the optical axis of the lens positioned substantially perpendicular to the CRT screen and to the film 2. The combination of the CRT 1 and the lens 3, or the lens 3 only is moved in parallel with the film 2, or the film 2 is moved in parallel with the CRT 1 and the lens 3 which are fixed in position, to photograph images on the CRT 1 on a plurality of frames of the film 2 (e.g., Unexamined Japanese Patent Publication Nos. SHO 61-77827 and SHO 60-252332, and Unexamined Japanese Utility Model Publication No. SHO 59-25521).

With the arrangement of FIG. 10, the different lenses 3 are used for photographing images on the different frames of the film 2. Since the production of the lenses 3 involves errors, these errors appear as enlarged on the film 2, with the result that the degree of focusing or image density differs from frame to frame to produce visually recognizable differences in quality between the photographed images. Such differences could lead to a diagnostic error. Furthermore, the apparatus is costly since the plurality of lenses 3, as well as of shutters 4, are required in corresponding relation to the number of frames.

The arrangement of FIG. 11 affords images of high quality and is therefore used for apparatus of the sophisticated. However, the parallel movement of the lens 3 and the CRT 1 requires a linear motor, bearings, rails, etc., which render the apparatus complex in its entirety. Alternatively, the film 2 must be moved within a dark chamber, which also makes the apparatus very complex and costly to manufacture.

SUMMARY OF THE INVENTION

A first object of the present invention is to provide a photographic apparatus which comprises a single photographic lens provided on a controllably rotatable lens mount and which is adapted to photograph CRT images on a plurality of frames of film with the lens to obtain photographed images of identical quality with high precesion without differences in the sharpness or density of images obtained.

A second object of the present invention is to provide an apparatus of the type described wherein a stepping motor or the like is used for a lens mount drive mechanism for rotating the lens mount so that the lens can be precisely moved to and stopped at a plurality of positions for focusing CRT images on the plurality of frames of the film although the mechanism has a very simple construction.

A third object of the present invention is to to provide an apparatus of the type described wherein the lens mount is mounted on a support member rotatably about a first support shaft which is rotatable about a second support shaft so that CRT images can be photographed on at least six frames of film with the single lens.

A fourth object of the present invention is to provide an apparatus of the type described which comprises a first sensor for detecting zero point where the rotation of the lens mount is initiated and a second sensor for detecting zero point where the rotation of the support member is initiated so that after completion of a photographic operation for the film, the lens can be reliably returned to its original position by returning the lens mount and the support member to the initial zero points of rotation.

A fifth object of the present invention is to provide an apparatus of the type described which comprises a plane mirror interposed between the CRT and the lens to eliminate the need to align the CRT, the lens and the film and to thereby render the apparatus compact in its entirety.

BRIEF DESCRIPTION OF THE DRAWINGS

FIGS. 1 to 6 show an embodiment of the present invention;

DESCRIPTION OF THE PREFERRED EMBODIMENTS

The present invention will be described below with reference to the illustrated embodiments.

Figure 1:
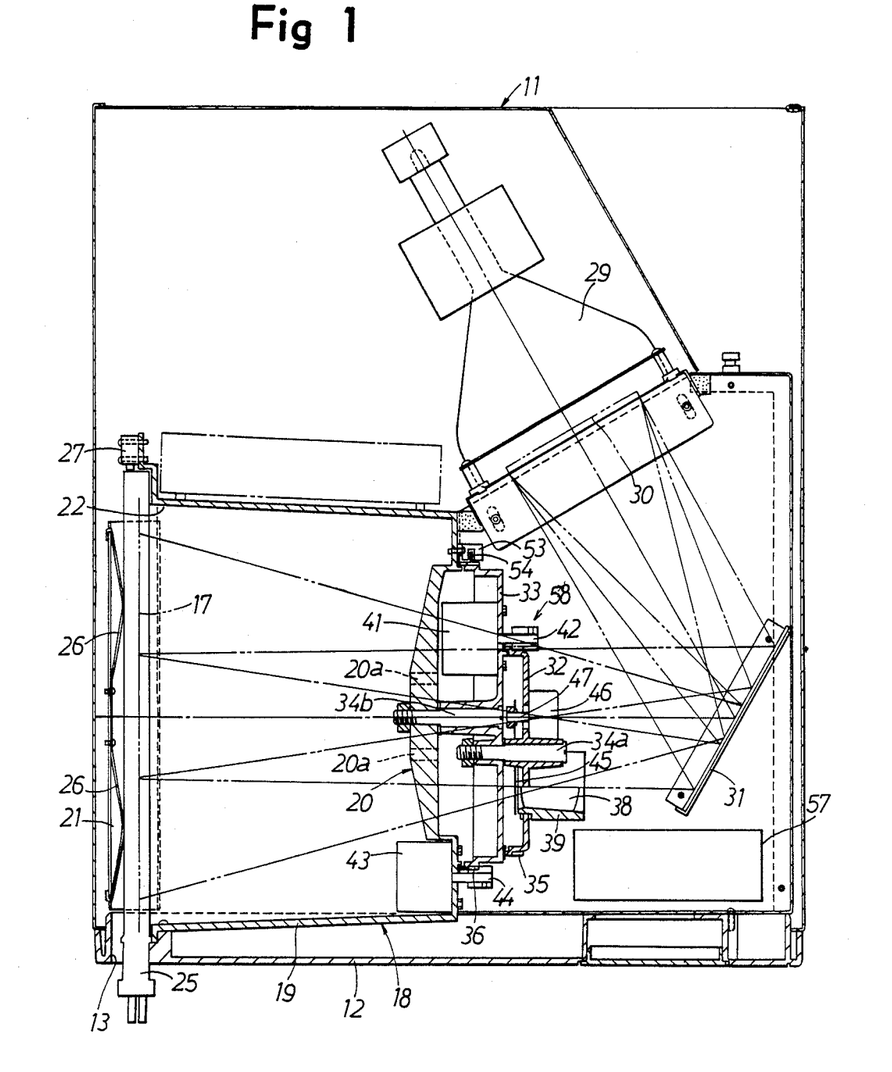
FIG. 1 is a plan view in section.
Figure 2:
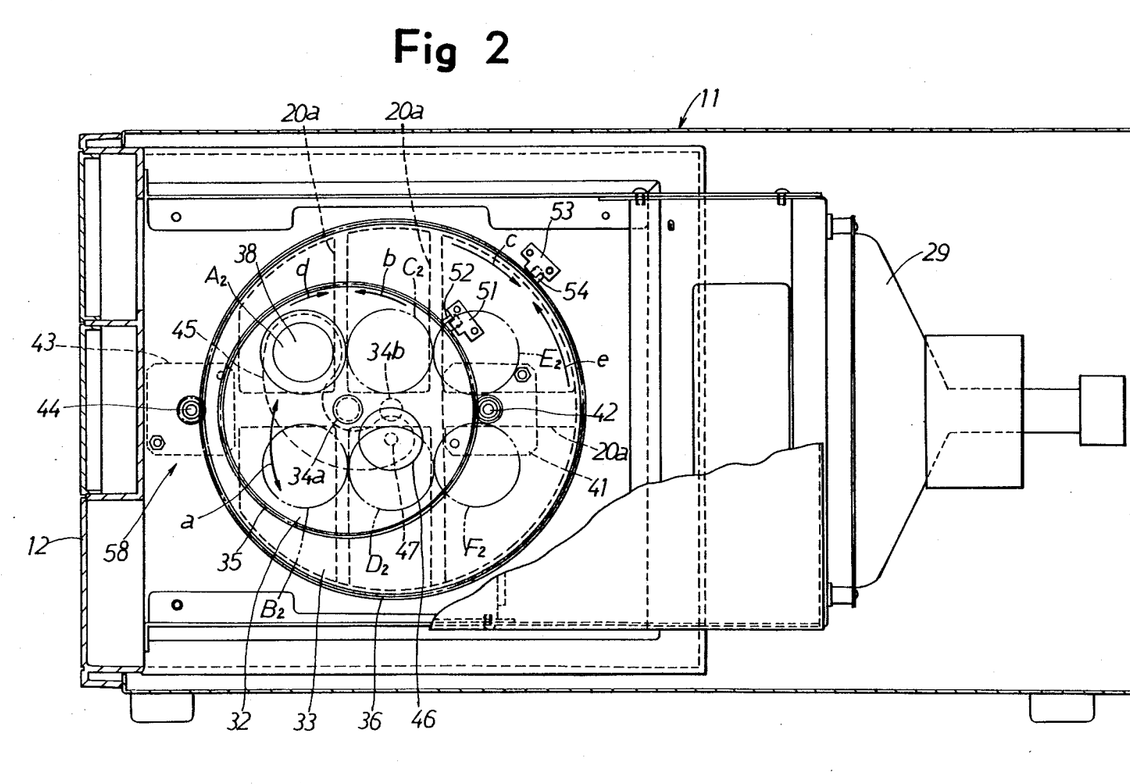
FIG. 2 is a side elevation in section.
Figure 3:
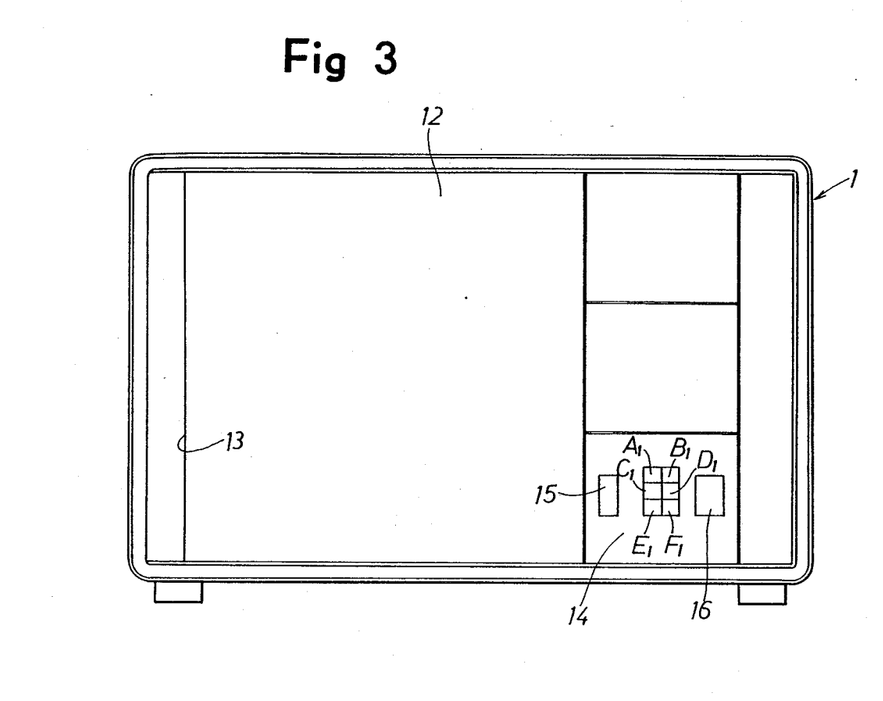
FIG. 3 is a front view.

Referring to FIGS. 1 to 3, a case 11 has a front wall 12 formed with a film inlet 13 at its left end and provided with an operation panel 14 toward its right end. Mounted on the operation panel 14 are a power supply switch 15, a shutter button 16, and first to sixth pilot lamps A1 to F1 for indicating the positions of first to sixth frames A to F of the film 17 to be described later.

A darkroom forming member 18 is in the form of a bottomed tube comprising a tubular wall 19 and a closure wall 20 closing the right end of the tubular wall 19, and is fixedly accmmodated in the case 11. A film accommodating portion 21 is provided adjacent to an opening 22 of the forming member 18 at the left side thereof. Indicated at 20a are ribs of the closure wall 20.

Figure 4:
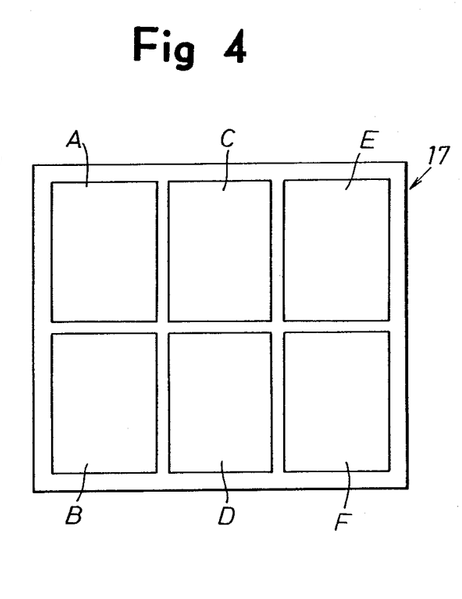
FIG. 4 is a front view of a film.

A film holder 25 for the film 17 is removably inserted in the accommodating portion 21 through the inlet 13 of the case 11 and is biased rightward by plate springs 26 into intimate contact with the opening edge of the darkroom forming member 18. Thus, the holder 25 closes the opening 22, rendering the interior of the member 18 serviceable as a darkroom. A film sensor 27 is actuated by being pressed on by the holder 25 when the holder 25 is inserted into the portion 21. As seen in FIG. 4, the film 17 is rectangular and has six frames, i.e. the first to sixth frames A to F to be used for photography.

A CRT 29 is of the 7 - 8 type having a flat screen for projecting thereon an image 30, for example, of a section of the human body by X-ray diagnosis or ultrasonic diagnosis.

A plane mirror 31 is disposed within the case 11 at the left end of its front side for opposing the screen of the CRT 29 to the film 17 in parallel therewith and projecting the screen of the CRT 29 on the film 17.

A lens mount 32 is mounted on a support member 33 rotatably about a first support shaft 34a extending in the left-to-right (lateral) direction. The support member 33 is rotatably supported by a second lateral support shaft 34b mounted on the closure wall 20 at its center. Accordingly, the lens mount 32 is rotatable about the first support shaft 34a and is also revolvable about the second support shaft 34b. The lens mount 32 has a gear 35 along its outer periphery. The support member 33 is formed with a gear 36 along its outer periphery.

The image 30 on the CRT 29 is focused on the film 17 by a photographic lens 38, which is attached to the lens mount 32 by a barrel 39. The optical axis of the lens 38 is perpendicular to the film 17 and to the screen of the CRT 29 on the plane mirror 31.

A first stepping motor 41 mounted on the support member 33 is driven through a predetermined angle at a time by pulses of specified frequency. The drive shaft 42 of the motor 41 is in mesh with the gear 35 of the lens mount 32 to reversibly rotate the mount 32 about the first support shaft 34a. Indicated at 43 is a second stepping motor mounted on the closure wall 20 of the darkroom forming member 18. The motor 43 is driven through a predetermined angle at a time by pulses of specified frequency to reversibly rotate the support member 33 about the second support shaft 34b by its drive shaft 44 meshing with the gear 36 of the support member 33.

A shutter 45 is fixed to a rotary shaft 47 of a rotary solenoid 46 attached to the lens mount 32. The solenoid 46 functions to reciprocatingly rotate the shutter 45 about the lateral shaft 47 through an angle of 35 degrees in the direction of arrow a, whereby the lens 38 is opened at its right side for a predetermined period of time.

A photodetector 51 mounted on the support member 33 optically detects a projection 52 on the lens mount 32, thereby detecting a zero point where the rotation of the lens mount 32 is initiated. A second photodetector 53 mounted on the closure wall 20 optically detects a projection 54 on the support member 33, thereby detecting a zero point where the support member 33 is initiated into rotation. When the lens mount 32 and the support member 33 are in the zero points, the lens 38 is in a first position A2 indicated in a solid line in FIG. 2, where the image 30 is focused on the first frame A of the film 17. By virtue of the rotation of the lens mount 32 about the support shaft 34a and the rotation of the support member 33 about the support shaft 34b, the lens 38 in this position is brought to second to sixth positions B2, C2, D2, E2 and F2 successively, as will be described later.

In corresponding relation to the first position A2, the second position B2, the third position C2 and the fourth position D2, the support member 33 is formed with apertures for passing the light from the lens 38 therethrough toward the film 17. Further in corresponding relation to the first to sixth positions A2 to F2, the closure wall 20 similarly has apertures.

A microcomputer 57 provided in the case 11 receives signals from the shutter button 16, the film sensor 27 and the photodetectors 51, 53 and controls the pilot lamps A1 to F1, the rotary solenoid 46 and the stepping motors 41, 43 in the following manner.

Figure 5:
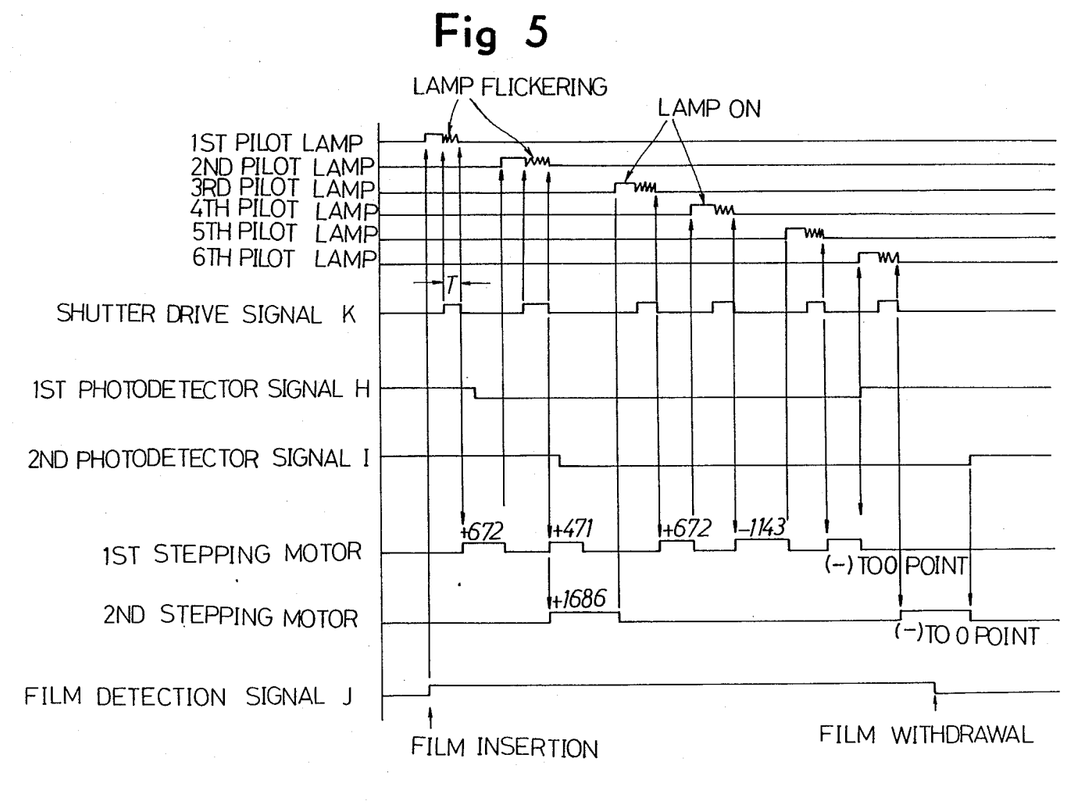
FIGS. 5 and 6 are time charts for illustrating the operation of the embodiment.

With reference to the time chart of FIG. 5, a control operation will be described for photographing images 30 on the six frames of the film 17. At first, the lens mount 32 and the support member 33 are set in the zero-point positions shown in FIG. 2, and the lens 38 is in the first position A2 for focusing the image 30 of the CRT 29 on the first frame A of the film 17. At this time, the computer 57 is receiving detection signals H and I from the photodetectors 51 and 53, respectively. First, the film holder 25 is inserted through the film inlet 13 to set the film 17 in the accommodating portion 21, whereupon the film sensor 27 is turned on, feeding a detection signal J to the computer 57, which in turn lights up the first pilot lamp A1, indicating that the image is to be photographed on the first frame A of the film 17.

In this state, the shutter button 16 is depressed for the first frame, whereupon the computer produces a shutter drive signal K, causing the solenoid 46 to rotatingly open the shutter 45 at the leading edge of the drive signal K and to close the shutter 45 at the trailing edge of the signal K. The exposure time T during which the shutter 45 is held open is automatically determined by measuring the brightness of the image 30 on the CRT 29. During this time, the first pilot lamp A1 flickers, indicating that the image 30 is being photographed on the first film frame A. On completion of photographing on the first frame A, the computer drives the first stepping motor 41 forward at a pulse number of 672, rotating the lens mount 32 through about 105 degrees in the direction of arrow b and bringing the lens 38 to the second position B2 where an image 30 on the CRT 29 is to be focused on the second frame B of the film 17. When the lens 38 has been moved to the second position B2, the second pilot lamp B1 goes on, indicating that the image is to be photographed on the second film frame B.

Upon depression of the shutter button 16 for the second frame, the second pilot lamp B1 goes on flickering as in the foregoing case, and the rotary solenoid 46 is energized to open and close the shuuter 45 to photograph the CRT image 30 on the second film frame B. Subsequently the computer forwardly drives the first stepping motor 41 at a pulse number of 471 to rotate the lens mount 32 about 74 degrees in the direction of arrow b and also drives the second stepping motor 43 forward at a pulse number of 1686, rotating the support member 33 through 180 degrees in the direction of arrow c, whereby the lens 38 is brought to the third position C2. This turns on the third pilot lamp C1.

When the shutter button 16 is depressed the third time, the third pilot lamp C1 flickers, and the rotary solenoid 46 is energized to photograph an image 30 of CRT 29 on the third film frame C. The first stepping motor 41 is thereafter forwardly driven at a pulse number of 672, rotating the lens mount 32 through about 74 degrees in the direction of arrow d and moving the lens 38 to the fourth position D2, whereupon the fourth pilot lamp D1 is turned on.

When the shutter button 16 is depressed the fourth time, the fourth pilot lamp D1 flickers, and an image 30 on the CRT 29 is photographed on the fourth frame D of the film 17. The first stepping motor 41 is then reversely rotated at a pulse number of 1143, thereby rotating the lens mount 32 through 180 degrees in the direction of arrow c to bring the lens 38 to the fifth position E2. The fifth pilot lamp E1 is thereafter turned on.

Upon the depression of the shutter button 16 for the fifth frame, the fifth pilot lamp E1 flickers, and an image 30 on the CRT 29 is photographed on the film fifth frame E. Subsequently, the first stepping motor 41 is reversely rotated to rotate the lens mount 32 through about 106 degrees in the direction of arrow d to the initial zero-point position, bringing the lens 38 to the sixth position F2, whereupon the sixth pilot lamp F1 is turned on. In this case, the first stepping motor 41 is not driven under the control of the number of pulses but is driven until the first photodetector 51 detects the zero point, whereby the lens mount 32 is reliably returned to the orignal position where the rotation is initiated.

When the shutter button 16 is depressed the sixth time, the sixth pilot lamp F1 flickers, and an image 30 on the CRT 29 is photographed on the sixth frame F of the film 17. The second stepping motor 43 is thereafter reversely rotated, rotating the support member 33 through about 180 degrees in the direction of arrow e to the initial zero-point position to move the lens 38 to the first position A2.

In this way, the images on the CRT 29 are photographed successively on the frames A, B, C, D, E and F of the film every time the shutter button 16 is depressed, and the lens mount 32 and the support member 33 can be reliably returned to the original zero-point positions upon completion of the photographing operation for the six frames. In this case, the lens mount 32 and the support member 33, having rotated in the directions of arrows b and c, are rotated through the same angle in the directions of arrows d and e to the original positions. If the lens mount 32, as well as the support member 33, were continuously rotated in the same direction, the electric wiring cords thereon would become entangled, whereas the above feature obviates such a likelihood.

Figure 6:
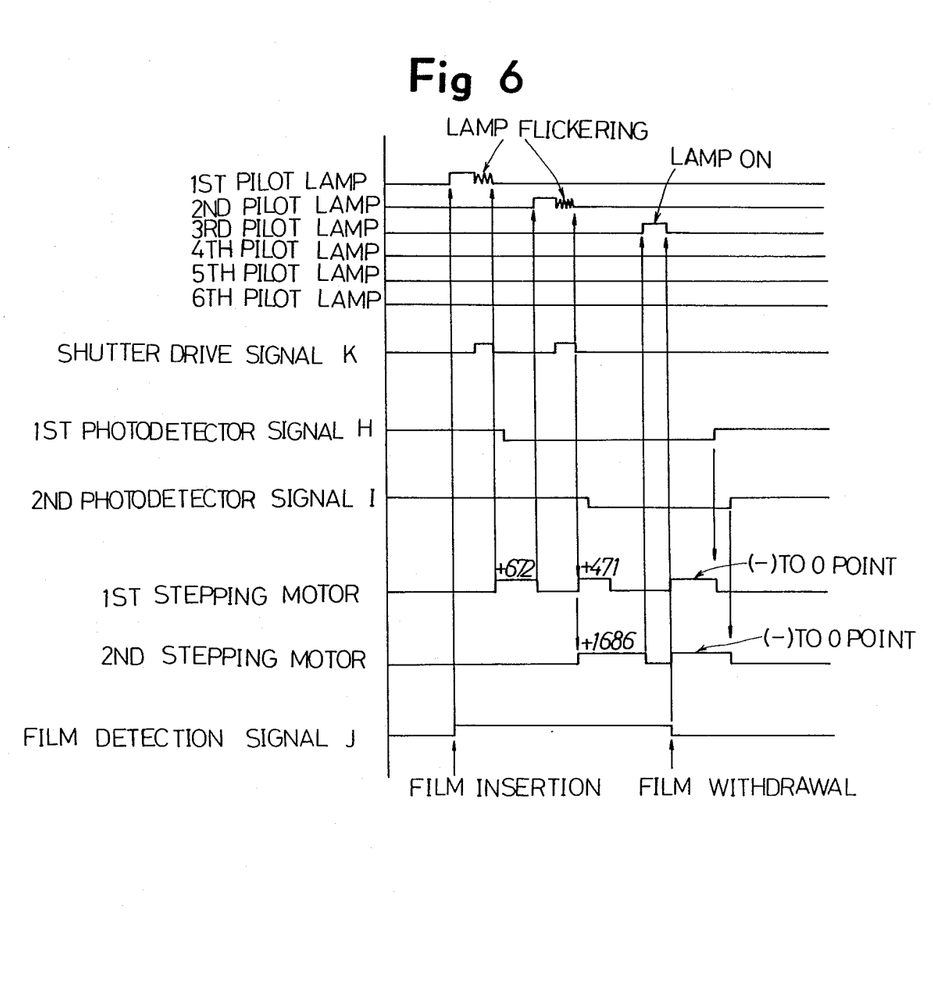

With reference to the time chart of FIG. 6, the operation of the microcomputer 57 will be described when the film 17 is withdrawn from the accommodating portion 21 during photographing operation. Suppose the film holder 25 is withdrawn from the accommodating portion 21 to draw out the film 17 after images have been photographed on the first frame A and the second frame B by depressing the shutter button 16 twice in the same manner as above. The third pilot lamp C1 which is on is then turned off, and the first and second stepping motors 41 and 43 are reversely driven, rotating the lens mount 32 in the direction of arrow d to its zero-point position and rotating the support member 33 in the direction of arrow e to its zero-point position to bring the lens 38 from the third position C2 to the first position A2.

Thus, when the film 17 is withdrawn from the accommodating portion 21 during photographing operation, the lens mount 32 and the support member 33, having rotated in the directions of arrows b and c, thereafter rotate through the same angle in the directions of arrows d and e to the zero-point positions, so that it is unlikely that the electric wiring cords on the mount 32 and the support member 33 will be entangled.

The stepping motors 41, 43, the gears 35, 36, etc. constitute a drive mechanism 58 for moving the lens mount 32 about the support shafts 34a, 34b which are substantially parallel with the optical axis of the lens 38. By the drive mechanism 58 the lens 38 is moved to and stopped at the plurality of positions A2, B2, C2, D2, E2 and F2 for focusing images 30 on the CRT 29 on the frames A, B, C, D, E and F of the film 17 individually.

Figure 7:
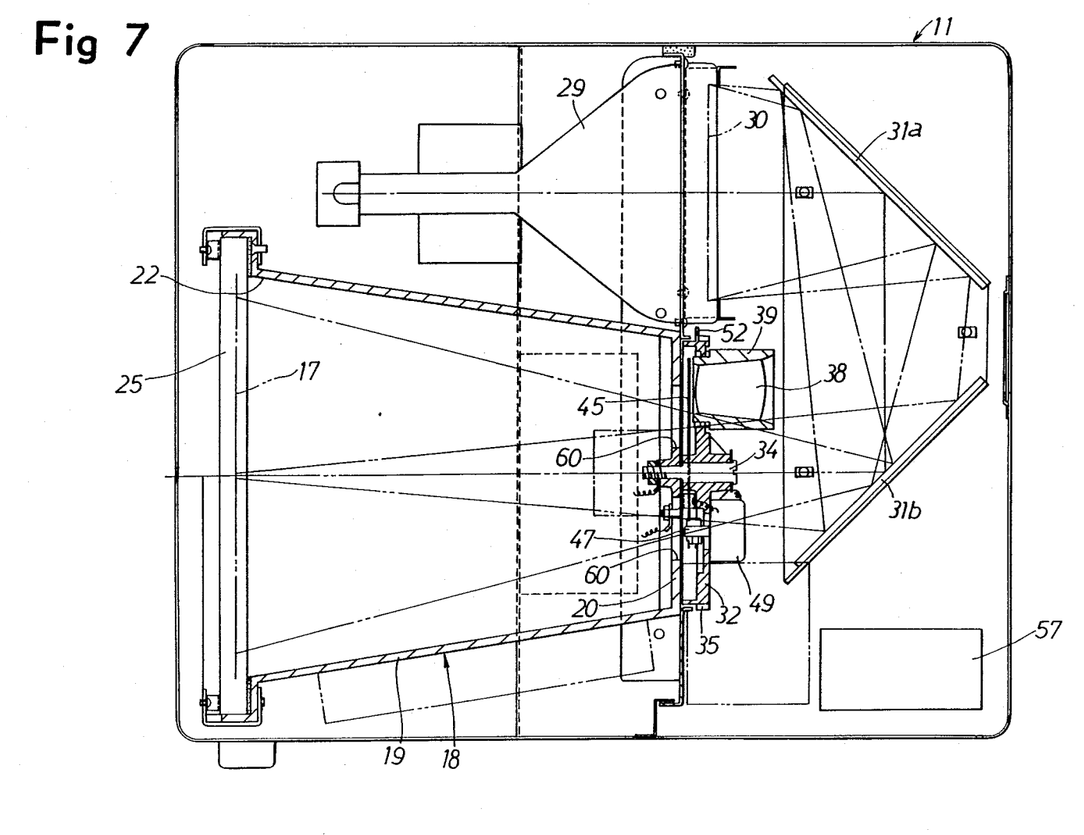
FIG. 7 is a front view in section showing another embodiment.
Figure 8:
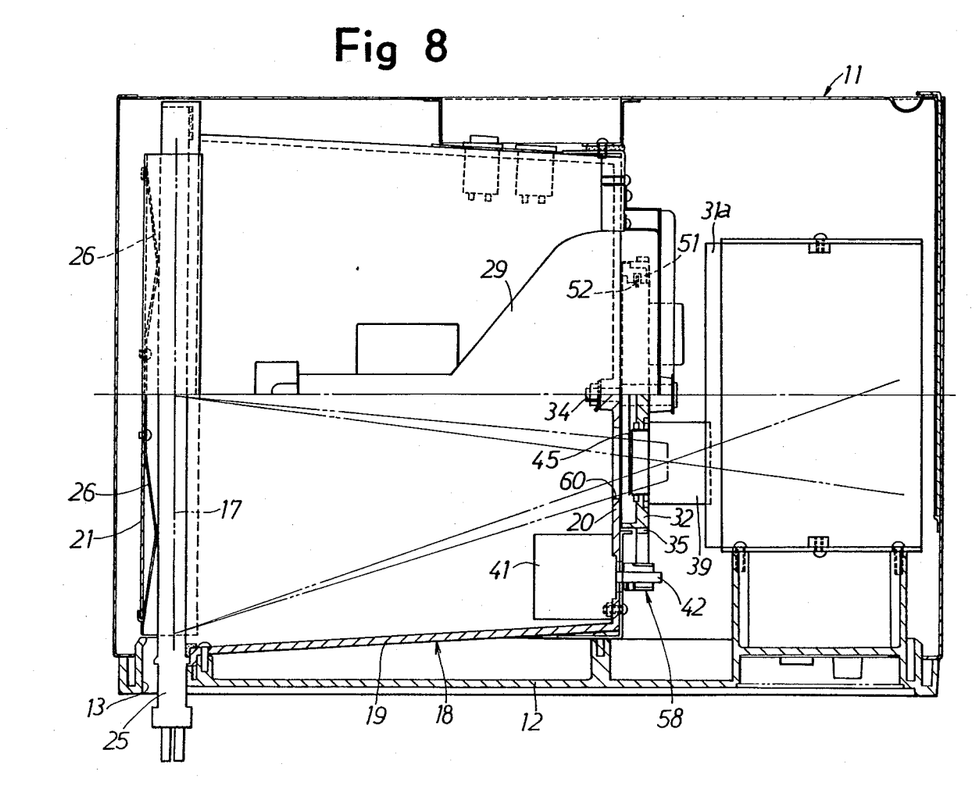
FIG. 8 is a plan view in section of the same.
Figure 9:
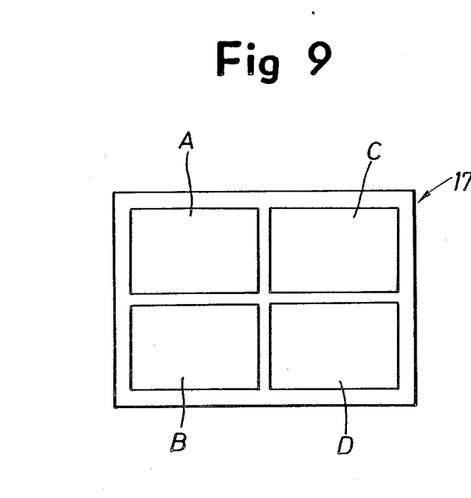
FIG. 9 is a front view of a film.

FIGS. 7 and 8 show another embodiment, by which images are photographed on four frames of a film 17, i.e., first to fourth frames A to D as seen in FIG. 9. The image 30 on a CRT 29 is opposed to the film 17 in parallel therewith by being reflected at a first plane mirror 31a and a second plane mirror 31b. Thus, the image is projected onto the film 17 as opposed thereto by the plane mirrors 31a, 31b.

A lens mount 32 supporting a lens 38 thereon is rotatably mounted on a support shaft 34 extending laterally and supported by a closure wall 20 of a darkroom forming member 18 at the center thereof. The support shaft 34 is in alignment with the axis of the film 17 and the axis of the screen of the CRT 29 reflected from the plane mirrors 31a, 31b. The lens 38 is fixed to the lens mount 32 by a barrel 39, with its optical axis positioned perpendicular to the film 17 and the CRT screen reflected from the plane mirrors 31a, 31b.

A drive mechanism 58 for rotating the lens mount 32 about an axis substantially parallel with the optical axis of the lens 38 comprises a stepping motor 41, a gear 35, etc. for moving the lens 38 to first to fourth positions for focusing images 30 of the CRT 29 on the frames A to D of the film 17. Stated more specifically, the stepping motor 41 is reversibly driven under the control of a microcomputer 57 to rotate the lens mount 32 foward or reversely about the support shaft 34 from the first position where a zero-point detecting photodetector 51 detects a projection 52, whereby the lens 38 is successively moved from the first position to the third to fourth positions.

FIG. 7 shows apertures 60 formed in the closure wall 20 in corresponding relation to the first to fourth positions.

While the foregoing embodiments are adapted to photograph images 30 of the CRT 29 on 6 or 4 frames of the film 17, the number of frames to be used is not limitative; for example, 2, 3, 5, 7 or more frames may be usable. Although the lens mount 32 is made movable about one or two support shafts 34, the mount may be made movable about at least three shafts 34, and a suitable number of shafts are used in accordance with the number and arrangement of film frames to be used. The plane mirror(s) 31 interposed between the film and the CRT 29 according to the foregoing embodiments may be omitted, such that the screen of the CRT 29 is opposed to the film 17 as positioned substantially parallel therewith.

The apparatus of the present invention has the following advantages. CRT images can be focused on frames of a film by moving a single photographic lens 38, giving photographed images free from differences in quality due to an error involved in the manufacture of the lens. Unlike the arrangement wherein the lens 39 and CRT 29 are moved in parallel with the film, the present apparatus does not require a linear motor, bearings, rails, etc. but has a simple construction wherein the lens mount 32 is made movable about an axis parallel with the optical axis of the lens 38 by a stepping motor or the like. Consequently, the lens 38 can be precisely moved to and stopped at a plurality of positions for focusing CRT images on the frames of film.

What is claimed is:

1. An apparatus for photographing images on a CRT wherein a photographic lens is interposed between the CRT and a film for focusing images on the CRT on the film to photograph the CRT images on a plurality of frames of the film, the apparatus being characterized in that the apparatus comprises a lens mount for supporting the single lens thereon with its optical axis positioned perpendicular to the film, and a drive mechanism for rotating the lens mount about a support shaft substantially parallel with the optical axis of the lens so that the lens is moved to and stopped at a plurality of positions for focusing the CRT images on the film frames individually.

2. An apparatus as defined in claim 1 wherein the lens mount is mounted on a support member rotatably about a first support shaft substantially parallel with the optical axis of the lens, and the support member is rotatable about a second support shaft substantially parallel with the optical axis of the lens, the lens mount being rotatable about the first support shaft and revolvable about the second support shaft by the drive mechanism to photograph the CRT images on six frames of the film.

3. An apparatus as defined in claim 2 wherein the drive mechanism comprises a first stepping motor for reversibly rotating the lens mount about the first support shaft and a second stepping motor for reversibly rotating the support member about the second support shaft.

4. An apparatus as defined in claim 2 or 3 which further comprises a first sensor for detecting a zero point where the rotation of the lens mount is initiated and a second sensor for detecting a zero point where the rotation of the support member is initiated, the lens mount and the support member being returnable to the zero points after completion of a photographing operation for the film so that the sensors detect the zero points.

5. An apparatus as defined in claim 1 wherein a plane mirror is interposed between the CRT and the film for opposing the screen of the CRT to the film in parallel therewith and projecting the CRT screen on the film.

6. An apparatus as defined in claim 1 wherein the lens mount is rotatable about the support shaft, and the support shaft is substantially in alignment with the central axes of the film and the screen of the CRT, the lens mount being rotatable to and stoppable at four positions around the support shaft by the drive mechanism to photograph the CRT images on four frames of the film.

7. An apparatus as defined in claim 1 or 6 wherein the drive mechanism comprises a stepping motor for reversibly rotating the lens mount about the support shaft.

8. An apparatus as defined in claim 1 or 6 which further comprises a sensor for detecting a zero point where the rotation of the lens mount is initiated, and the lens mount is returnable to the zero point after completion of a photographing operation for the film so that the sensor detects the zer point.

* * * * *